Patented July 6, 1943

2,323,499

UNITED STATES PATENT OFFICE 2,323,499

PRODUCTION OF ALUMINUM SULPHATE

William S. Wilson, Brookline, Mass., assignor to Monsanto Chemical Company, St. Louis, Mo., a corporation of Delaware No Drawing. Application August 2, 1940, Serial No. 350,077

7 Claims. (Cl. 23—123)

This invention relates to the preparation of sulphates of aluminum which have an unusually high content of alumina and at the same time are substantially completely water soluble. More specifically the invention relates to the preparation of water soluble high basic sulphates of aluminum of low water content, or of mixtures of such sulphates in any proportion with substantially anhydrous neutral sulphate of alumina.

Basic aluminum sulphate is aluminum sulphate which contains materially less sulphuric acid than that required by the formula $Al_2(SO_4)_3$, or which contains alumina in excess of that required by the formula $Al_2(SO_4)_3$, otherwise frequently written as $Al_2O_3.3SO_3$. It is convenient to refer to the alumina present as excess alumina in terms of basicity or percentage basicity. Thus, a product having a total alumina content of 11 parts in the hundred, of which 8.5 parts are required by the formula $Al_2O_3.3SO_3$ and 2.5 parts are in excess, may be said to have 11% total alumina and a basicity, or percentage basicity, of 22.7% ($2.5/11 \times 100$).

The present invention is in general concerned with the preparation of various hydrates of basic sulphates having the general formula $Al_2O_3.2SO_3$, otherwise known as disulphate of alumina. Thus it is possible in accordance with the methods described herein to prepare disulphates of alumina containing $9H_2O$, $8H_2O$, $4H_2O$ and $2H_2O$ respectively. The invention is also concerned, however, with the preparation of sulphates having an $Al_2O_3$ content varying from about 21 to 34% and a basicity of between 22 and 34%. These products are all readily soluble in water, and lend themselves to easy dehydration to a lower hydrated form. They have the advantage of having a lower sulphuric acid content and a higher content of $Al_2O_3$ available in soluble form than the trisulphate of alumina now being made commercially, and hence are definitely superior to previously prepared products for such purposes as water purification and paper manufacture.

In the past aluminum sulphate has been prepared commercially by reacting bauxite, commercial aluminum hydrate, or other acid soluble aluminous materials with sulphuric acid at 50 to 55° Bé. strength, with the addition of water or wash liquors, so that a neutral or slightly basic solution of aluminum sulphate results which is subsequently boiled down to a solid product. This commercial product contains from 16–18% soluble alumina and from 40–45% water and is in the form of a glass-like solid solution. If one attempts to dehydrate commercial aluminum sulphate by heating however, it is found that the material softens up to a semi-fluid sticky mass. Moreover, further heating will cause fluidity throughout with the exception of the top surface which is cooled to a temperature below the solidification point by evaporation. This results in the formation of a crust or film over the surface which increases the difficulty both mechanically and thermally, of removing water vapor. This fluid sticky melt also tends to adhere strongly to any metallic surface, and in the course of continuous operation of the equipment will build up accretions of sulphate which require frequent removal, a factor of disadvantage in any commercial process, and especially so in this case where the deposited material is an extremely hard cement-like structure.

The commercial manufacture of aluminum sulphate as it is carried out at present results primarily in the formation of a neutral aluminum sulphate. However, when attempts are made to dehydrate, as by boiling down or any similar method, basic aluminum sulphate, the same conditions are encountered. Moreover, when boiling down basic sulphates insoluble sulphates are formed, which may render the final product unsuitable for commercial operations.

Numerous methods have been devised for overcoming the difficulties due to the physical characteristics of the solid solution of neutral sulphate referred to above, but none of them has been entirely satisfactory. One method of treatment involves spray drying, or almost instantaneous dehydration of extremely fine droplets of concentrated aluminum sulphate solution in a suitable apparatus. This type of process, however, results in a very bulky and voluminous product, so that an appreciable amount of the economic advantage gained by the dehydration is lost. Other methods which have been employed are concerned with mechanical means for handling the semi-fluid to fluid mass which is formed as a result of heating the commercial product. That these methods possess certain inherent disadvantages is evidenced by the fact that anhydrous aluminum sulphates are not now produced commercially to any appreciable extent, if at all.

As far as is now known, no attempt has been made to prepare high basic sulphates of alumina of the unusually high $Al_2O_3$ content of the products described herein, nor have dehydrated products of this nature been prepared.

It is accordingly an important object of the present invention to provide a method of preparing sulphates of alumina of the highest possible alumina content which are at the same time completely soluble in water.

A further object of the invention is to provide a method of preparing substantially anhydrous or almost anhydrous basic sulphates of alumina which are substantially completely soluble in water.

A further object of the invention is to provide a method of dehydrating high basic sulphates of alumina without the formation of gummy substances and without the formation of insoluble basic sulphates of alumina.

A still further object of the invention is to provide a method of preparing high basic sulphates of alumina of low water content from relatively dilute solutions thereof.

A still further object of the invention is to provide a method of producing a sulphate of alumina of high basicity which is capable of the same commercial uses as the commonly known neutral sulphate of alumina and will be capable of dehydration to crystalline or anhydrous products containing more alumina than it is possible to obtain from the neutral product.

Still further objects and advantages of the invention will appear from the following description and appended claims. Before explaining in detail the present invention, however, it is to be understood that the invention is not limited in its application to the details described herein, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The present invention is carried out in general by treating solutions of high basic sulphates of alumina in such a manner as to obtain crystalline products, which products may be readily dehydrated. P. M. Marguerite, in Compt. Rendu., vol. 90, page 1354, refers to methods of making high basic sulphates of alumina and also refers to the crystallization of such sulphates. Thus, he proceeds by heating ammonia alum or ordinary aluminum sulphate, lixiviating the resulting calcined product with water, and permitting the resulting liquor to crystallize. Marguerite produces insoluble salts during the calcination, however, which require removal and result in a loss in alumina. Also, Marguerite's methods involve steps which are quite costly and time consuming, and are therefore of little commercial value.

If a solution of aluminum sulphate of above 22% basicity and an alumina concentration of 1–11% is boiled down to concentrations where crystallization can take place, a quantity of insoluble basic aluminum sulphates are formed, which may have either the formula $4Al_2O_3.2SO_3.18H_2O$ or the formula $3Al_2O_3.4SO_3.9H_2O$. The presence of these insoluble basic compounds in the final product is undesirable, even in amounts as low as 0.2%. By proceeding in accordance with the present invention it is possible to obtain crystals of $Al_2O_3.2SO_3.9H_2O$ having a basicity of 33⅓% and containing about 24% of $Al_2O_3$, which crystals are substantially free of insoluble materials. This is accomplished by suspending a mass of preformed crystals of the above composition in a liquor having a basicity of 21–22% and an $Al_2O_3$ content of between 11 and 15%, which results in a state of equilibrium between the solid and liquid phases of the mixture. An aluminum sulphate liquor having a basicity of about 33⅓% and an $Al_2O_3$ content of about 8–10% is then continuously added to the above equilibrium mixture, while simultaneously applying heat, the rate of addition or application of each being controlled in such a manner as to keep the $Al_2O_3$ content of the liquid phase of the mass, which is now out of equilibrium, i. e., super-saturated, within the range of 11 to 15%. By proceeding in this way it is possible to super-saturate the entire mixture in respect to $Al_2O_3.2SO_3.9H_2O$ and since a substantial amount of seed in the form of preformed crystals is present, this super-saturation is rapidly translated into crystal growth. Thus the evaporation or concentration of the liquor of 8 to 10% $Al_2O_3$ content is carried out at a range of concentrations where only soluble phases of aluminum sulphate are present. As the boiling point of solutions containing from 11 to 15% $Al_2O_3$ is about 104–106° C., the evaporation referred to above preferably takes place within that range of temperatures.

Similar results as above may be obtained with temperatures as low as 75° C. In order to obtain satisfactory results at such low temperatures, however, it is usually necessary to resort to additional means for obtaining sufficient evaporation for the purposes of this invention.

A portion of the slurry containing the suspended crystals prepared in the above manner may be continuously or periodically removed from the crystallizing apparatus and the crystals separated from the liquor by filtration, centrifuging or the like, the liquor being returned to the crystallization vessel. The crystals are then dried at 50–60 C., yielding a pure product of $Al_2O_3.2SO_3.9H_2O$ which is substantially free of insolubles.

A further understanding of the above method for obtaining crystal material from aluminum sulphate liquor will be obtained from the following example.

A solution containing 10,000 pounds of aluminum sulphate in water and having an $Al_2O_3$ content of 8% is prepared and the basicity thereof adjusted by the addition of either aluminum sulphate liquor of 33⅓ basicity or by the addition of sulphuric acid to yield a basicity of 22%. The resulting solution is transferred to a suitable lead lined tank, equipped with a suitable stirring device and furnished with heating coils connected to a source of steam which is at a pressure of 50–100 pounds. The solution is then concentrated to an alumina content of 14% by boiling. 1000 pounds or preformed crystals of $Al_2O_3.2SO_3.9H_2O$ or $Al_2O_3.2SO_3.12H_2O$ are then added to the solution and the contents of the tank are agitated and heated to the boiling point i. e. from 104 to 106° C. A solution of aluminum sulphate of 33⅓% basicity is then transferred continuously from a suitable storage tank to the evaporator at a rate which is adjusted in accordance with the amount of steam being supplied to the coils of the evaporator. Thus, for every 100 pounds of 8% $Al_2O_3$ feed liquor it is essential to evaporate 65–66 pounds of water.

The continuous addition of highly basic liquor to the tank containing 22% basic liquor increases the basicity of the mass and thus produces a condition of super-saturation which is immediately discharged by deposition of crystals of $Al_2O_3.2SO_3.9H_2O$ on the seed which has been supplied to the tank and kept suspended therein by agitation. By adjusting the rate of feed of the high basic liquor so that it keeps pace with the evaporation rate, the composition of the liquid phase of the mass is maintained substantially uniform i. e. at an $Al_2O_3$ content of 14%. This dual control of the rate of feed of the liquor and the evaporation rate is necessary in order to insure that the liquid phase in the evaporator shall not contain less than 11% $Al_2O_3$ or more then 15% $Al_2O_3$.

As the crystals are formed the liquor and suspended crystals are continuously or intermittently drawn off through a suitable outlet pipe and are separated in a centrifuge which may operate either continuously or intermittently. The clear liquor of essentially 22% basicity and 14% $Al_2O_3$ content is then returned to the evaporator and the crystals are stored for commercial use as such or for subsequent conversion to a dehydrated product. By varying the retention time of the crystalline solid phase in the evaporator, the size of crystals produced can be varied within wide limits.

The chief advantage of proceeding in the above manner to obtain crystals is that an aluminum sulphate of high basicity is obtained which is entirely water soluble. Thus if direct boiling down had been used insoluble phases would have resulted with a consequent contamination of the product and loss in alumina. Although it is possible on a small scale to avoid the formation of insoluble basic sulphates by boiling down very rapidly, this is difficult on a larger scale where the longer time required for evaporation tends to produce insoluble products.

The crystals of $Al_2O_3.2SO_3.9H_2O$ obtained in the above manner can be readily dehydrated to $Al_2O_3.2SO_3.2H_2O$ without the formation of insoluble matter. Thus, by calcining them at a particle temperature of 170° C. for 20–30 minutes a compound of the apparent formula $Al_2O_3.2SO_3.4H_2O$ is obtained which contains about 30% $Al_2O_3$, 46.9% $SO_3$ and 24.1% $H_2O$. If a product having the apparent formula $$Al_2O_3.2SO_3.2H_2O$$

is desired, the particle temperature should be from 175–180° C. with a retention time of 30–45 minutes. The resulting compound, which can also be made at a particle temperature range of 190–200° C., using a shorter retention time, contains about 34% $Al_2O_3$, 53.5% $SO_3$ and 12.5% $H_2O$.

By heating the crystals to 275° C. it is possible to convert them to a product having the apparent formula $Al_2O_3.2SO_3.1H_2O$. This product, however, is essentially completely insoluble, and cannot be reverted to a higher soluble hydrate by the addition of water without the formation of other insoluble basic sulphate phases.

There are several known methods for preparing solutions of high basic sulphates which may be directly used or treated for use in connection with the methods of this invention. A new and different method has been devised, however, which is most suited for the stated purpose. This method can be carried out in several ways, but involves broadly the preparation of a crude crystal of $Al_2O_3.2SO_3.9H_2O$ which contains 20 to 24% $Al_2O_3$ and 3 to 8% insoluble matter consisting of unused aluminous material and insoluble matter originally present in the raw material. This crude crystal should be dissolved or leached to form a solution containing from 8 to 10% $Al_2O_3$ with simultaneous reduction of any ferric iron present to ferrous iron. The resulting solution is then permitted to settle or clarify, and is freed of resulting mud.

Further details regarding the above method of preparing solutions of aluminum sulphate of high basicity will be found in another application of mine being filed simultaneously herewith, Serial Number 350,079, filed August 2, 1940.

Although the invention has been described as primarily directed to the preparation of high basic products of low water content, it should be understood that it may be applied with equal success to neutral sulphates of alumina, or to mixtures of high basic and neutral sulphates of alumina in varying proportions.

To obtain mixtures of high basic and neutral sulphates of alumina, the methods previously described must be varied as follows. Solutions of lower basicity than 33⅓% but at the same time higher than 22% basicity, are added to the equilibrium mixture containing liquor of 22% basicity and crystal seed such as hereinbefore described. The range of $Al_2O_3$ content of the liquid phase of the equilibrium mixture should be raised, however, in inverse proportion to the basicity of the liquor being converted to crystals. For example, if a liquor is added having a basicity of only about 23 to 24%, the minimum $Al_2O_3$ content of the liquid phase of the equilibrium mixture would have to be in the neighborhood of 13%. On the other hand, if a liquor is added having a basicity of about 29 or 30%, the minimum $Al_2O_3$ content of the liquid phase of the equilibrium mixture would have to be about 11.3%. At the same time the upper limits of $Al_2O_3$ concentration may be raised by an equivalent amount, so that with a starting liquor of relatively low basicity, the upper limit of required $Al_2O_3$ content in the liquid phase of the equilibrium mixture would approach 17%. Thus, the range of $Al_2O_3$ content permissible in the liquid phase of the equilibrium mixture may vary in accordance with the basicity of the liquor being crystallized from 11–15% to 13–17%.

To obtain crystals from liquors having basicities varying from neutral to 22% basicity, a similar procedure is employed. However, in this case it is no longer necessary to employ the 22% basic equilibrium mixture previously described. Instead the liquor to be crystallized is continuously evaporated in the presence of a suspension of seed crystals. At 104° C. super-saturation occurs in the case of neutral liquor when the $Al_2O_3$ concentration of the liquor in the evaporator is 13% or higher, whereas in the case of 22% basic liquor super-saturation occurs when the $Al_2O_3$ concentration of the liquor in the evaporator is 11% or higher. In the presence of crystal seed the $Al_2O_3$ concentration of the liquor will not exceed the above saturation concentration to any great extent, provided the rate of heat input for evaporation is equivalent to the rate of feed of the liquor.

It is ordinarily unnecessary to resort to the methods described herein to obtain crystals of neutral aluminum sulphate as solutions of the latter type and solutions having basicities up to 22% may be crystallized by more direct methods such as are disclosed in still another application of mine being filed simultaneously herewith, Serial Number 350,078, filed August 2, 1940.

What is claimed is:

1. The method of preparing a water-soluble basic aluminum sulphate of high alumina content from solutions of basic aluminum sulphate which comprises forming a body of aluminum sulphate liquor of 21 to 22% basicity and 11 to 17% $Al_2O_3$ content containing crystalline seed, continuously adding to said body aluminum sulphate liquor of 22 to 34% basicity and continuously evaporating the resulting solution at such a rate as to maintain an $Al_2O_3$ content of 11 to 17% in the liquid phase thereof, whereby a supersaturated solution of high basicity and crystals of aluminum sulphate having an average basicity of at least 22% are formed, and then separating the resulting crystals and subjecting them to dehydrating conditions.

2. The method of preparing a water-soluble basic aluminum sulphate of high alumina content from solutions of basic aluminum sulphate which comprises forming a body of aluminum sulphate liquor of 21 to 22% basicity and 11 to 15% $Al_2O_3$ content containing crystalline seed, continuously adding to said body aluminum sulphate liquor of 33⅓% basicity and continuously evaporating the resulting solution at such a rate as to maintain an $Al_2O_3$ content of 11 to 15% in the liquid phase thereof, whereby a supersaturated solution of high basicity and crystals of aluminum sulphate having a basicity of 33⅓% are formed, and then separating the resulting crystals and subjecting them to dehydrating conditions.

3. The method of preparing a water-soluble basic aluminum sulphate of high alumina content from solutions of basic aluminum sulphate which comprises forming a body of aluminum sulphate liquor of 21 to 22% basicity and 13 to 17% $Al_2O_3$ content containing crystalline seed, continuously adding to said body aluminum sulphate liquor of 24% basicity and continuously evaporating the resulting solution at such a rate as to maintain an $Al_2O_3$ content of 13 to 17% in the liquid phase thereof, whereby a supersaturated solution of high basicity and crystals of aluminum sulphate having an average basicity of at least 22% are formed, and then separating the resulting crystals and subjecting them to dehydrating conditions.

4. The method of preparing a water-soluble basic aluminum sulphate of high alumina content from solutions of basic aluminum sulphate which comprises forming a body of aluminum sulphate liquor of 21 to 22% basicity and 11 to 17% $Al_2O_3$ content containing crystalline seed, continuously adding to said body aluminum sulphate liquor of 22 to 34% basicity and continuously evaporating the resulting solution at temperatures between 75 and 106° C. at such a rate as to maintain an $Al_2O_3$ content of 11 to 17% in the liquid phase thereof, whereby a supersaturated solution of high basicity and crystals of aluminum sulphate having an average basicity of at least 22% are formed, and then separating the resulting crystals and subjecting them to dehydrating conditions.

5. The method of preparing a water-soluble basic aluminum sulphate of high alumina content from solutions of basic aluminum sulphate which comprises forming a body of aluminum sulphate liquor of 21 to 22% basicity and 11 to 17% $Al_2O_3$ content, continuously adding to said body aluminum sulphate liquor of higher than 22% basicity and continuously evaporating the resulting solution at such a rate as to maintain an $Al_2O_3$ content of 11 to 17% in the liquid phase thereof, whereby a supersaturated solution of high basicity and crystals of aluminum sulphate having an average basicity of at least 22% are formed, and then separating the resulting crystals.

6. The method of preparing a water-soluble basic aluminum sulphate of high alumina content from solutions of basic aluminum sulphate which comprises forming a body of aluminum sulphate liquor of 21 to 22% basicity and 11 to 17% $Al_2O_3$ content containing crystalline seed, continuously adding to said body aluminum sulphate liquor of 22 to 34% basicity and 8 to 10% $Al_2O_3$ content and continuously evaporating the resulting solution at such a rate as to maintain an $Al_2O_3$ content of 11 to 17% in the liquid phase thereof, whereby a supersaturated solution of high basicity and crystals of aluminum sulphate having an average basicity of at least 22% are formed, and then separating the resulting crystals.

7. The method of preparing a water-soluble basic aluminum sulphate of high alumina content from solutions of basic aluminum sulphate which comprises mixing a quantity of aluminum sulphate liquor of 21 to 22% basicity and 11 to 17% $Al_2O_3$ content with a quantity of aluminum sulphate liquor of higher than 22% basicity, and simultaneously evaporating the mixture at such a rate as to maintain an $Al_2O_3$ content of 11 to 17% in the liquid phase thereof, whereby a supersaturated solution of high basicity and crystals of aluminum sulphate having an average basicity of at least 22% are formed, and then separating the resulting crystals.

WILLIAM S. WILSON.